(12) United States Patent
Dotan et al.

(10) Patent No.: US 9,516,059 B1
(45) Date of Patent: Dec. 6, 2016

(54) USING MOCK TOKENS TO PROTECT AGAINST MALICIOUS ACTIVITY

(75) Inventors: Yedidya Dotan, Tel Aviv (IL); Lawrence N. Friedman, Arlington, MA (US); Amit Monovich, Shaarey Tikva (IL); Alexander Volanis, Chelmsford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 504 days.

(21) Appl. No.: 13/170,732

(22) Filed: Jun. 28, 2011

(51) Int. Cl.
  *G06F 21/55* (2013.01)
  *H04L 29/06* (2006.01)
  *H04L 9/32* (2006.01)

(52) U.S. Cl.
  CPC ....... *H04L 63/1491* (2013.01); *H04L 63/1483* (2013.01)

(58) Field of Classification Search
  CPC .................. H04L 63/1483; H04L 63/1491
  USPC ................................................. 726/6, 23, 22
  See application file for complete search history.

(56) References Cited

U.S. PATENT DOCUMENTS

| | | | |
|---|---|---|---|
| 6,085,320 A | 7/2000 | Kaliski, Jr. | |
| 6,130,621 A | 10/2000 | Weiss | |
| 6,363,489 B1* | 3/2002 | Comay et al. | 726/22 |
| 6,985,583 B1 | 1/2006 | Brainard et al. | |
| 7,363,494 B2 | 4/2008 | Brainard et al. | |
| 7,502,467 B2 | 3/2009 | Brainard et al. | |
| 7,502,933 B2 | 3/2009 | Jakobsson et al. | |
| 7,725,730 B2 | 5/2010 | Juels et al. | |
| 7,810,147 B2 | 10/2010 | Duane et al. | |
| 7,831,522 B1* | 11/2010 | Satish et al. | 705/76 |
| 8,370,389 B1* | 2/2013 | Dotan | 707/784 |
| 8,695,097 B1* | 4/2014 | Mathes et al. | 726/25 |
| 2003/0145224 A1* | 7/2003 | Bailey | H04L 63/083 726/5 |
| 2006/0282660 A1* | 12/2006 | Varghese | G06Q 20/341 713/155 |
| 2007/0136799 A1* | 6/2007 | Brennan | 726/9 |
| 2007/0174614 A1* | 7/2007 | Duane et al. | 713/168 |
| 2007/0282723 A1* | 12/2007 | Cohen et al. | 705/35 |
| 2008/0052359 A1* | 2/2008 | Golan et al. | 709/206 |
| 2008/0162338 A1* | 7/2008 | Samuels | G06F 21/40 705/38 |
| 2009/0228780 A1* | 9/2009 | McGeehan | 715/234 |
| 2009/0241187 A1* | 9/2009 | Troyansky | 726/22 |
| 2010/0077483 A1* | 3/2010 | Stolfo et al. | 726/24 |
| 2011/0126289 A1* | 5/2011 | Yue et al. | 726/26 |
| 2011/0167494 A1* | 7/2011 | Bowen et al. | 726/24 |
| 2011/0214182 A1* | 9/2011 | Adams et al. | 726/23 |

\* cited by examiner

Primary Examiner — Theodore C Parsons
(74) Attorney, Agent, or Firm — BainwoodHuang (57) ABSTRACT

A technique provides protection against malicious activity. The technique involves providing a mock token to fraudster equipment. The mock token appears to be a legitimate user token that identifies a legitimate user (e.g., an actual user token, a token seed, etc.). The technique further involves receiving, from the fraudster equipment, an authentication request which uses the mock token and, in response to receiving the authentication request which uses the mock token from the fraudster equipment, performing a set of authentication server operations to protect against future activity by the fraudster equipment (e.g., deny access to the fraudster equipment, acquire specific information about the fraudster equipment, output a message to subscribers of an eFraud network, and so on).

15 Claims, 5 Drawing Sheets

| MOCK TOKEN FIELD 140 STORING MOCK TOKENS 34 | DISTRIBUTION DATA FIELDS 142 STORING DISTRIBUTION METHOD, LOCATION, TIME, OTHER DISTRIBUTION INFORMATION, ETC. | DISCOVERED USE DATA FIELDS 144 STORING NUMBER OF DISCOVERIES DISCOVERY METHOD(S), LOCATION(S), TIME(S), OTHER DISCOVERY INFORMATION, ETC. | EFN DEPLOYMENT DATA FIELDS 146 STORING SUBSCRIBERS, TIME, OTHER DEPLOYMENT INFORMATION, ETC. | OTHER INFORMATION FIELDS 148 (E.G., TYPE, STATUS, ETC.) |
|---|---|---|---|---|
| E189DF45 | | | | |
| G991KW32 | | | | |
| B224QW88 | | | | |
| . . . | . . . | . . . | . . . | . . . |

USING MOCK TOKENS TO PROTECT AGAINST MALICIOUS ACTIVITY

BACKGROUND

A variety of tactics exist for obtaining sensitive data in an unauthorized manner. In some situations, such malicious and unauthorized activity may go completely unnoticed.

For example, an electronic hacker may be able to thwart computerized security mechanisms and steal sensitive data from a company database. Such sensitive data may include credit card information, personal address information, and financial information among other things. The electronic hacker may then try to use the stolen data such as by purchasing products using stolen credit card information.

As another example, a phisher may be able to obtain sensitive data by masquerading as a trustworthy entity during an electronic communication. Such sensitive data may include usernames, passwords, and authentication tokens, among other things. Similarly, the phisher may then try to use the stolen data such as by logging in to an actual user's and effectuating transactions.

SUMMARY

Improved techniques involve protecting against fraud using mock tokens which appear to be legitimate user tokens that identify legitimate users. First, the mock tokens are allowed to fall into the hands of fraudsters. When the fraudsters later attempt to use the mock tokens to access protected resources (e.g., during authentication), such use is easily detectable and access to the protected resources can be denied. Additionally, such use provides an opportunity for security-related equipment to obtain information about the fraudsters such as IP addresses of fraudster equipment, fraudster geographical location information, fraudster browser capabilities, routing information, and so on. This fraudster information can then be used to enhance various forms of security such as adaptive authentication, i.e., risk-based authentication which can perform authentication operations based on a variety of factors including client IP addresses, client geographical locations, client browser capabilities, etc.

One embodiment is directed to a method of fraud protection (i.e., protection against malicious activity). The method includes providing a mock token to fraudster equipment. The mock token appears to be a legitimate user token that identifies a legitimate user (e.g., an actual user authentication token code, a token seed, etc.). The method further includes receiving, from the fraudster equipment, an authentication request which uses the mock token and, in response to receiving the authentication request which uses the mock token from the fraudster equipment, performing a set of authentication server operations to protect against future activity by the fraudster equipment (e.g., deny access to the fraudster equipment, acquire specific information about the fraudster equipment, alert subscribers of an eFraud network (EFN) which is a collaborative community of cybercrime-fighting entities, and so on).

Other embodiments are directed to various apparatus (e.g., clients, servers, specialized intrusion detection devices, authentication agents, etc.), various circuits and components of such apparatus, computer program products and computer readable media, and other processes. Some embodiments are directed to an eFraud network, methods and devices of an EFN, and so on.

In some arrangements, a token seed database stores a set of legitimate user token seeds corresponding to a set of legitimate users. Each legitimate user token seed is a secret from which an actual user token is derived. In these arrangements, providing the mock token to the fraudster equipment involves storing the mock token in the token seed database among the set of legitimate user token seeds corresponding to the set of legitimate users. Accordingly, the fraudster equipment obtains the mock token upon accessing the token seed database in an unauthorized manner.

In some arrangements, a credit card database stores (i) a set of legitimate user tokens and (ii) a set of credit card numbers which correspond to a set of legitimate users. In these arrangements, providing the mock token to the fraudster equipment involves storing the mock token and a mock credit card number in the credit card database among the set of legitimate user tokens and the set of credit card numbers which correspond to the set of legitimate users. As a result, the fraudster equipment obtains the mock token upon accessing the credit card database in an unauthorized manner.

In some arrangements, the fraudster equipment includes a phishing device. In these arrangements, providing the mock token to the fraudster equipment involves inputting the mock token into the phishing device in a manner which appears to be a legitimate login attempt by a legitimate user.

In some arrangements, performing the remedial operation in response to detected use of the mock token involves at least one of preventing the fraudster equipment from accessing a protected resource, communicating with the fraudster equipment to obtain device-specific information, and outputting a message (or alert) to a set of authentication servers. The message identifies the fraudster equipment as a source of malicious activity.

In some arrangements, performing the remedial operation involves providing the fraudster equipment with a response which appears to be successful authentication, and redirecting the fraudster equipment to a honey pot, i.e., special equipment and/or a special section of a network configured to obtain more information from the fraudster. Such operation further facilitates identification of the fraudster.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves protecting against malicious activity (hereinafter simply "fraud protection") using a mock token which appears to be a legitimate user token that identifies a legitimate user. Initially, the mock token is allowed to fall into the hands of a fraudster. Later, when the fraudster attempts to use the mock token to access a protected resource (e.g., during an authentication operation), such use is easily detectable and access to the protected resource can be denied. Furthermore, such use provides an opportunity for security-related equipment to obtain information about the fraudster such as an IP address of the fraudster's equipment, the fraudster's geographical location information, the fraudster's browser capabilities, routing information, etc. Such information can then be used to enhance various forms of security such as adaptive authentication which may perform authentication operations based on various factors including IP addresses, geographical locations, browser capabilities, and so on.

Figure 1:
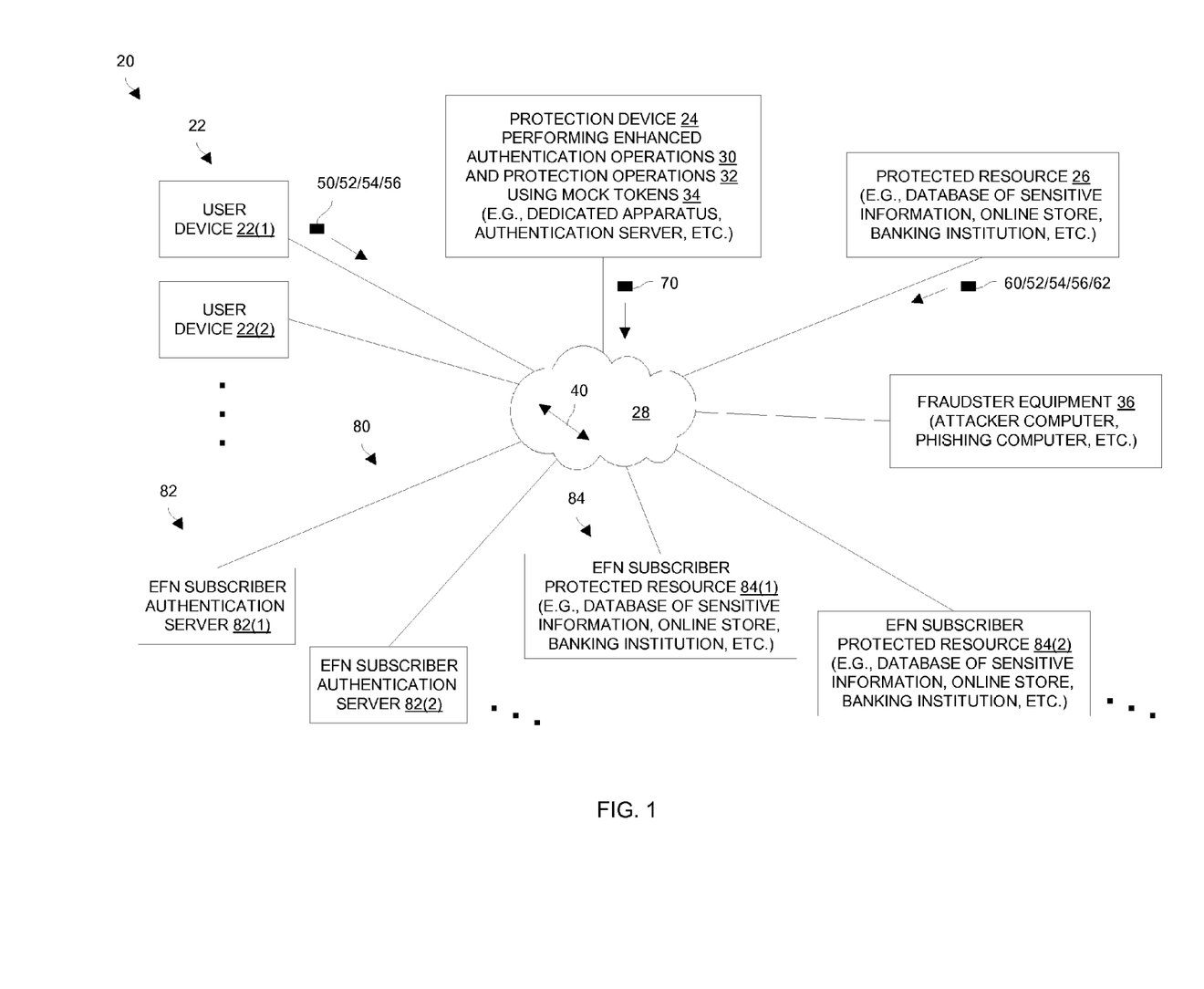
FIG. 1 is a block diagram of an electronic environment which protects against fraud using mock tokens.

FIG. 1 shows an electronic environment 20 which provides fraud protection using mock tokens. The electronic environment 20 includes user devices 22(1), 22(2), . . . (collectively, user devices 22), a protection device 24, a protected resource 26, and a communications medium 28.

Each user device 22 is operated by a user, and is constructed and arranged to enable that user to access the protected resource 26 when the user successfully authenticates with the protection device 24. Examples of suitable user devices 22 include general purpose computers, laptops, portable handheld computerized devices, smart phones, specialized hardware, and so on.

The protection device 24 is constructed and arranged to control user access to the protected resource 26 by performing enhanced authentication operations 30 in response to authentication requests (e.g., standard authentication, multi-factor authentication, adaptive authentication, etc.). The protection device 24 is further constructed and arranged to perform a variety of protection operations 32. These operations 30, 32 utilize mock tokens 34 which appear to be legitimate tokens corresponding to legitimate users but which are actually fake and easily detectable. The protection operations 32 include distributing the mock tokens 34, detecting attempts to use the mock tokens 34 by fraudster equipment 36, and gathering information on the fraudster equipment 36. Examples of the fraudster equipment 36 include intrusion devices operated by attackers attempting gain access and steal sensitive information, phishing computers, man-in-the-middle devices, and other malicious equipment which attempts to acquire sensitive data in an unauthorized manner. Further details regarding the mock tokens 34 will be provided shortly.

The communications medium 28 connects the various electronic components of the electronic environment 20 together to enable the electronic components to exchange electronic communications 40 (e.g., see the double arrow 40). The communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based devices and cabling, fiber optic devices and cabling, wireless devices, combinations thereof, and so on. Moreover, some portions of the communications medium 28 may include a computer network (e.g., the Internet, a LAN, a VPN, etc.) while other portions may include a different type of network (e.g., SAN hardware, etc.).

During operation of the electronic environment 20, the protection device 24 distributes the mock tokens 34 within the electronic environment 20. It should be understood that such distribution is intended to plant the mock tokens 34 at locations that are susceptible to theft of sensitive data such as criminal third party distribution channels, token seed databases from which user token codes are derived, devices suspected to be phishing equipment, and so on.

For example, suppose that the protected resource 26 is a database containing actual sensitive information (e.g., a credit card database, a financial transaction database, a customer database, a database of token seeds or keys, etc.). Here, the protection device 24 may add database entries containing mock tokens 34 to the database (e.g., an entry containing a mock token 34 along side a mock credit card number to appear as a complete entry among legitimate entries in the credit card database). If the database is ever stolen, the mock tokens 34 will fall into the hands of an attack who may later try to use the mock tokens 34.

As another example, suppose that there is a suspected phishing website within the electronic environment 20 (e.g., see the fraudster equipment). Here, the protection device 26 may impersonate a normal user device 22 and attempt to login to the suspected phishing website using mock tokens 34 (i.e., each login attempt using a mock token 34 appears as a legitimate login attempt). If the phishing website is real, the phisher may later try to use the mock tokens 34.

A variety of other techniques are available to disseminate the mock tokens 34 within the electronic environment 20. Further examples include, among other things, posing as a seller of actual tokens but selling the mock tokens 34, publicly posting the mock tokens 34 in a manner that appears to be accidental, and other honeypot-style activities.

Additionally, during operation, the protection device 24 provides access control to the protected resource 26 by operating as an authentication server. To this end, suppose that a user of a user device 22 wishes to access the protected resource 26. The user sends a login request 50 to a login interface of the protected resource 26 from the user device 22. The login request 50 includes an actual user identifier 52 (e.g., a username, a user ID, etc.) and an actual user authentication token code 54 (e.g., a string of symbols derived from a secret seed). The login request 50 may include other ancillary information 56 as well such as a password, an IP address of the user device 22, a geographical location of the user device 22, browser capabilities of the user device 22, and so on.

When the protected resource 26 receives the login request 50, the protected resource 26 sends an authentication request 60 to the protection device 24 which controls access to that protected resource 26 in an attempt to authenticate the user. The authentication request 60 includes the actual user identifier 52, the actual user authentication token code 54, and the ancillary information 56 which were included with the login request 50. In some arrangements, the authentication request 60 further includes other authentication factors 62 including any supplemental information that the protected resource 26 is able to gather from the user device 22 (e.g., typing speed, mouse movement speed, MAC address, login attempt time, etc.).

When the protection device 24 receives the authentication request 60 from the protected resource 26, the protection device 24 determines whether the authentication request 60 includes an actual user authentication token code 54 or a mock token 34, and outputs an authentication response 70 to the protected resource 26. The authentication response 70 indicates whether authentication is successful.

If the authentication request 60 includes a mock token 34, authentication is unsuccessful and the protection device 24 updates a database with all of the information currently available from the authentication request 60 including the various authentication factors 52, 54, 56, 62 supplied by the protected resource 26. Furthermore, the protection device 24 labels the user device 22 suspicious and may adjust future activity based on such labeling, e.g., deny all authentication attempts from that user device 22, challenge users from the same geographical location and with the same browser capabilities for additional authentication information, etc.

However, if the protection device 24 determines that the authentication request 56 includes an actual user authentication token code 54, the protection device 24 attempts to authenticate the user in a normal manner. If authentication is successful, the protection device 24 permits the user device 22 to access the protected resource 26. For example, within the authentication response 70, the protection device 24 may include data to redirect the user device 22 in an appropriate manner to a user portal of the protected resource 26 allowing access to the user.

However, if authentication is unsuccessful, the protection device 24 denies access to the user device 22. For example, within the authentication response 70, the protection device 24 may instruct the protected resource 26 to query the user device 22 for additional information but prevent the user device 22 from accessing the protected resource 26 perhaps allowing the user to retry authentication. Furthermore, the protection device 24 may label the user device 22 as suspicious equipment which may be trying to probe the authentication features of the protected resource 26 and the protection device 24.

In some arrangements, the protection device 24 further operates as a component of an eFraud network (EFN) 80 (i.e., a consortium of entities committed to collaboratively fighting against cyber-fraud) such as an ENF controller. Along these lines, the electronic environment 20 is shown as further including EFN subscriber authentication servers 82(1), 82(2), . . . (collectively, EFN subscriber authentication servers 82), and EFN subscriber protected resources 84(1), 84(2), . . . (collectively, EFN subscriber protected resources 84). Here, different entities may operate separate EFN subscriber authentication servers 82 which control access to corresponding EFN subscriber protected resources 84, i.e., server 82(1) controls access to resource 84(1), server 82(2) controls access to resource 84(2), and so on. Over time, each EFN subscriber authentication server 82 individually collects operating data such as the identities of suspicious devices (see the fraudster equipment 36). The EFN subscriber authentication servers 82 share their individually collected operating data with the EFN controller (i.e., the protection device 24) which aggregates the operating data together and then shares the aggregated operating data with subscribers, e.g., among other EFN subscriber authentication servers 82.

Additionally, the EFN controller can perform various operations on the individually collected operating data such as analyze the data, standardize the data and remove sensitive entity-specific data before share the data among the EFN subscriber authentication servers 82. Such operation enables EFN subscribers to take advantage of critical information (e.g., identities of suspicious devices) from other entities. Further details will now be provided with reference to FIG. 2.

Figure 2:
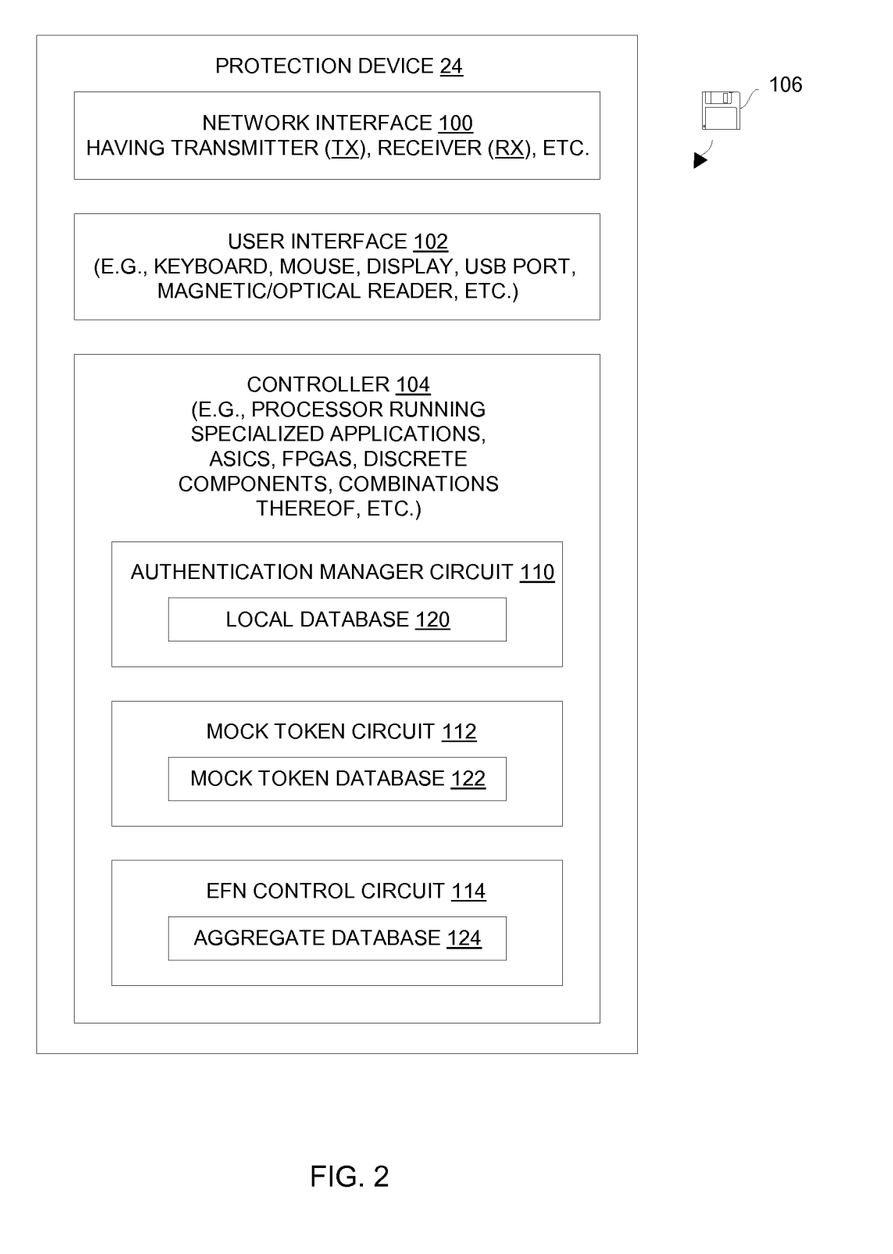
FIG. 2 is a block diagram of a device of the electronic environment of FIG. 2.

FIG. 2 shows particular details of the protection device 24 of the electronic environment 20. The protection device 24 includes a network interface 100, a user interface 102, and a controller 104.

The network interface 100 allows the protection device 24 to connect to the communications medium 28 (also see FIG. 1) and thus communicate with other devices of the electronic environment 20. Along these lines, the network interface 100 includes a transmitter (TX) to send electronic transmissions 40, and a receiver (RX) to receive electronic transmissions 40.

The user interface 102 receives input from a user (e.g., an administrator of the protection device 24) and provides output to the user. To this end, the user interface 102 includes a keyboard, a mouse, a display, and hardware/physical ports for other types of user communications (e.g., magnetic I/O, optical I/O, wireless I/O, etc.).

The controller 104 performs a variety of operations including the earlier-described authentication operations 30 and protection operations 32 (FIG. 1). The controller 104 can be implemented in a variety of ways including one or more processors running specialized software, application specific ICs (ASICs), field programmable gate arrays (FPGAs) and associated programs, discrete components, analog circuits, other hardware circuitry, combinations thereof, and so on.

In the context of one or more processors running specialized software, a computer program product 106 is capable of delivering all or portions of the software to the protection device 24. The computer program product 106 has a non-transitory (or non-volatile) computer readable medium which stores a set of instructions which controls one or more operations of the controller 104. Examples of suitable computer readable storage media include tangible articles of manufacture and apparatus which store instructions in a non-volatile manner such as CD-ROM, flash memory, disk memory, tape memory, and the like.

As shown in FIG. 2, the controller 104 includes an authentication manager circuit 110, a mock token circuit 112, and an EFN control circuit 114. The authentication manager circuit 110 is constructed and arranged to perform enhanced authentication operations in response to authentication requests 60. The mock token circuit 112 is constructed and arranged to distribute, track and identify attempts to use mock tokens 34 within the electronic environment 20. The EFN control circuit 114 is constructed and arranged to perform a variety of EFN operations such as share discovered information regarding the use of mock tokens 34 along with other EFN information with EFN subscriber authentication servers 82 (FIG. 1).

The various circuits 110, 112, and 114 are able to coordinate their operation among each other. For example, when the protection device 24 receives an authentication request 60, the authentication manager circuit 110 communicates with the mock token circuit 112 to determine whether a token of the authentication request 60 is an actual user authentication token code 54 corresponding to an actual user of a user device 22 or a mock token 34. If the token is an actual user authentication token code 54, the authentication manager circuit 110 attempts to authenticate the user based on matching current information from the user (e.g., information provided by the user during a login attempt on the protected resource 26, also see FIG. 1) and previously gathered information from a local database 120 (e.g., adaptive authentication factors including the user's previously known IP addresses, the user's previously known geographic locations, the user's previously known browser capabilities, etc.).

The mock token circuit 112 is capable of generating and disseminating mock tokens 34 within the electronic environment 20. The mock token circuit 112 then updates a mock token database 122 (e.g., a list of mock tokens 34) in order to subsequently identify and track use of the mock tokens 34. Accordingly, the mock token database 122 operates as a mock token repository which contains mock tokens 34. Additionally, the mock token circuit 112 periodically updates an aggregate database 124 of authentication factor information which is shared among EFN subscriber authentication servers 82 to improve their authentication capabilities.

In some arrangements, the mock token database 122 is integrated with the local database 120. That is, the mock token database 122 is essentially an embedded extension or augmentation of the local database 120. In these arrangements, the authentication manager circuit 110 and the mock token circuit 112 of the controller 104 can be merged together and simply accesses one database to perform authentication operations and detect use of mock tokens 34.

Additionally, in some arrangements, the mock tokens 34 do not include any discernable mock token mathematically property (e.g., the mock tokens 34 are randomly generated character strings) to prevent detection. That is, agreements may be reached with the authentication manager circuit 110 of the protection device 24 and other authentication managers of other authentication servers simply to prevent use of certain token codes and reserve them as mock tokens 34.

In other arrangements, the mock tokens 34 are mathematically or algorithmically discernable. That is, the mock tokens 34 contain certain bit patterns or watermarks, and/or satisfy a hidden algorithmic property thus enabling efficient identification by authentication managers.

Figure 3:
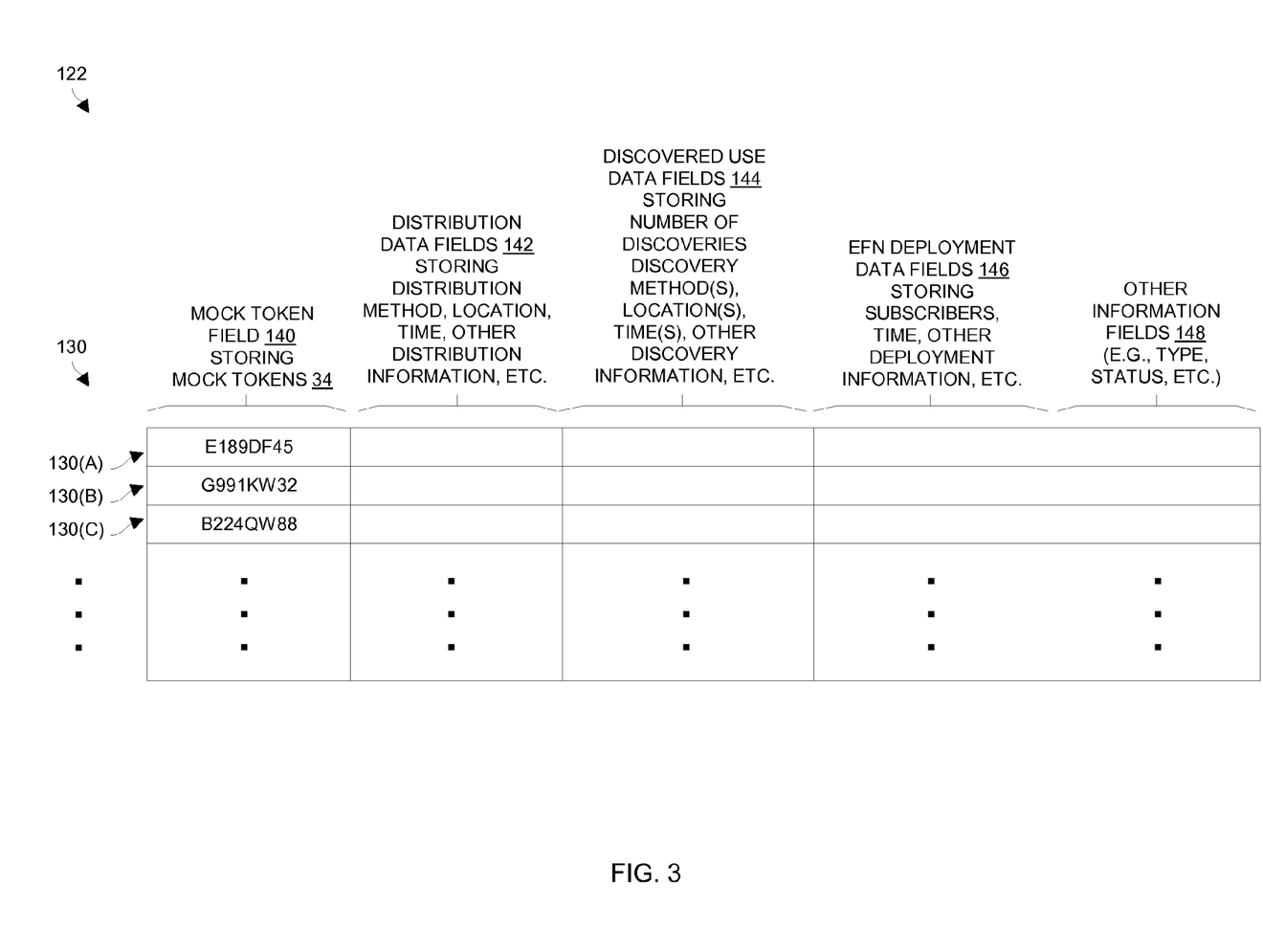
FIG. 3 is a block diagram of a database which is suitable for use within the electronic environment of FIG. 2.

FIG. 3 shows an example mock token database 122 utilized by the mock token circuit 112 of the protection device 24. The mock token database 122 includes a set of database entries 130(A), 130(B), 130(C), . . . (collectively, database entries 130).

Each database entry 130 includes a mock token field 140 to store a respective mock token 34, and distribution data fields 142 to store distribution data such as a method of how the mock token was distributed within the electronic environment 20 (e.g., in actual credit card database, in actual customer database, to potential phishing website, etc.), distribution geographic location, distribution data/time, other distribution information (method of derivation, method of detection, etc.), and so on. Additionally, each database entry 130 further includes discovered use fields 144 to store discovery data such as the number of discovered use attempts, how the mock tokens 34 were used during the attempts, IP addresses and geographical location of the user devices 22 that attempted to use the mock tokens 34, usage dates/times, other discovery information (e.g., MAC address, routing information, browser capabilities, typing speeds, number of attempts from the same IP address), and so on. Furthermore, each database entry 130 further includes EFN deployment data fields 146 to store EFN deployment data such as what data regarding the mock token 34 is shared with EFN subscriber authentication servers 82 (e.g., IP addresses and geographical location of the user devices 22 that attempted to use the mock tokens 34, usage dates/times, etc.), deployment date/time, and so on. Also, each database entry 130 includes other information fields 148 to store other information regarding the mock token 34 such as the mock token type (e.g., token seed/secret, user token code, etc.), status (e.g., user device currently under review, confirmed use by fraudster equipment, etc.), and so on.

In some arrangements, the information in the EFN deployment data fields 146 is stored separately, i.e., out of the mock token database 122. In these arrangements, the information is treated more as configuration information rather than in line items of the entries 130.

With reference again made to FIG. 2, the mock token circuit 112 of the protection device 24 accesses the mock token database 122 when distributing the mock tokens 34 (i.e., the mock token circuit 112 updates the distribution data fields 142 of entries 130 corresponding to distributed mock tokens 34). Additionally, the mock token circuit 112 (i) accesses the mock token database 122 when performing authentication operations 30 (i.e., to determine whether an authentication request 60 includes a mock token 34) or (ii) alternatively tests the token code 54 within the authentication request 60 (also see FIG. 1) satisfies an algorithm or possesses a watermark indicative of a mock token 34. Furthermore, the mock token circuit 112 accesses the mock token database 122 when updating the aggregate database 124 as part of the process of sharing authentication factor data with subscribers of the EFN 80. Further details will now be provided with reference to FIG. 4.

Figure 4:
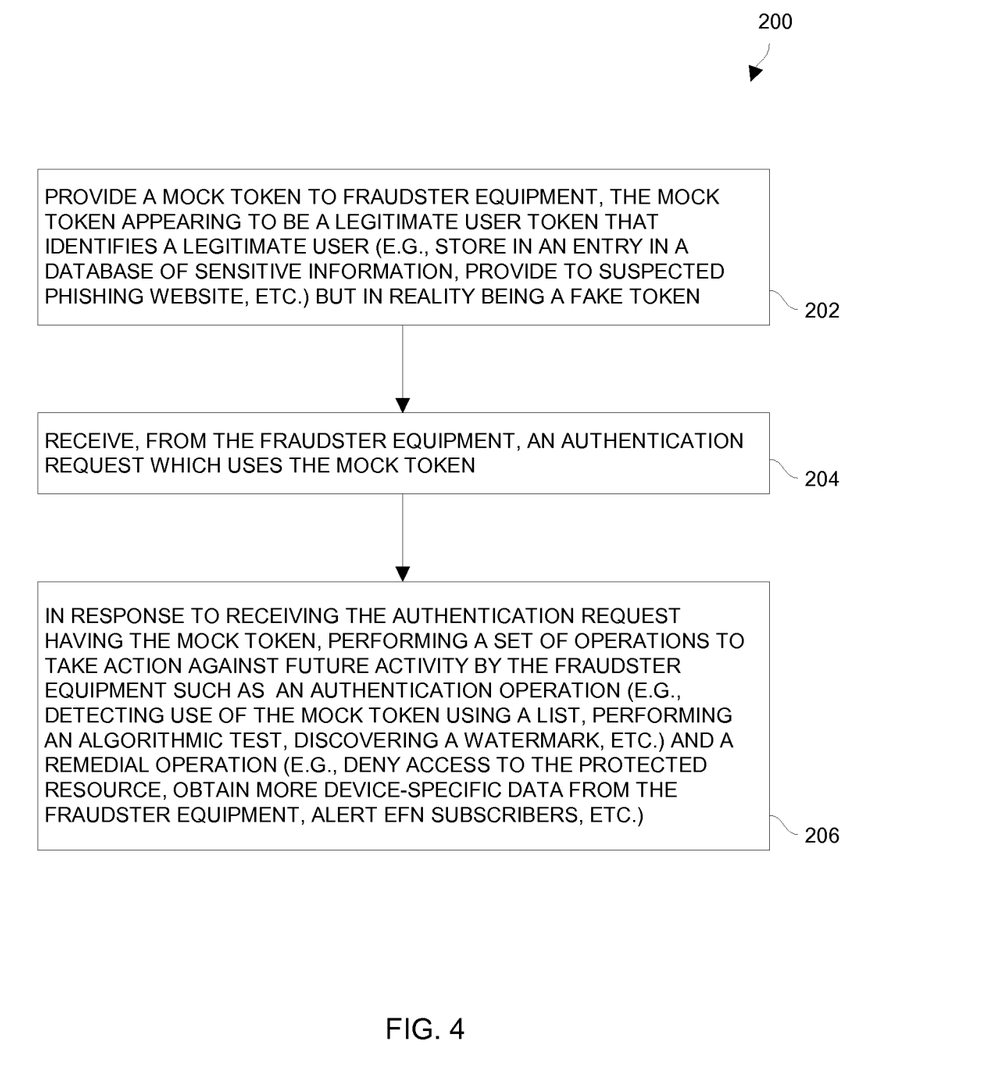
FIG. 4 is a flowchart of a procedure which is performed by the device of FIG. 2.

FIG. 4 is a flowchart of a procedure 200 which is performed by the protection device 24. In step 202, the protection device 24 provides a mock token 34 to the fraudster equipment 36 (also see FIG. 1). As mentioned earlier, the mock token 34 appears to be a legitimate user token that identifies a legitimate user. Such distribution may take the form of inserting the mock token 34 into a database of actual sensitive data (e.g., a credit card database) and the mock token 34 falls into the hands of the fraudster when the database is stolen. Alternatively, such distribution may take the form of performing a login attempt at a suspected phishing website (i.e., an entity masquerading as a trustworthy entity), and so on.

In step 204, the protection device 24 receives, from the fraudster equipment 36, an authentication request 60 which presents the mock token 34 as a token code 54. Here, the fraudster equipment 36 may include a device with the same IP address as that which acquired the mock token 34. Alternatively, the fraudster equipment 36 may include a separate device that operates simply as a user device 22 in an attempt to gain access to a protected resource using the mock token 34.

In step 206, the protection device 24 performs, in response to receiving the authentication request 60 which uses the mock token 34 from the fraudster equipment 36, a set of operations including an enhanced authentication operation which detects use of the mock token 34 and a remedial operation to take action against future activity by the fraudster equipment 36. The enhanced authentication operation may involve looking up a token code of the authentication request in a mock token database 122 (i.e., matching the token code of the authentication request 60 to a mock token 34 on a mock token list), applying an algorithm designed to identify the token code as a mock token 34, and discovering a watermark within the token code signifying that the token code is a mock token 34, among other things.

The remedial operations may include denial of access to a protected resource (e.g., see the protected resource 26 in FIG. 1). Additionally, the remedial operations may include an attempt to obtain more device-specific information from the fraudster equipment 36 (e.g., routing information, precise geographic location, ISP information, and so on). Furthermore, the remedial operations may include informing an owner of a database originally storing the mock token 34 that database confidentiality has been compromised, and deploying the discovered information to subscribers of an EFN 80 (FIG. 1) to alert other authentication managers and augment their authentication abilities. Further details will now be provided with reference to FIG. 5.

Figure 5:
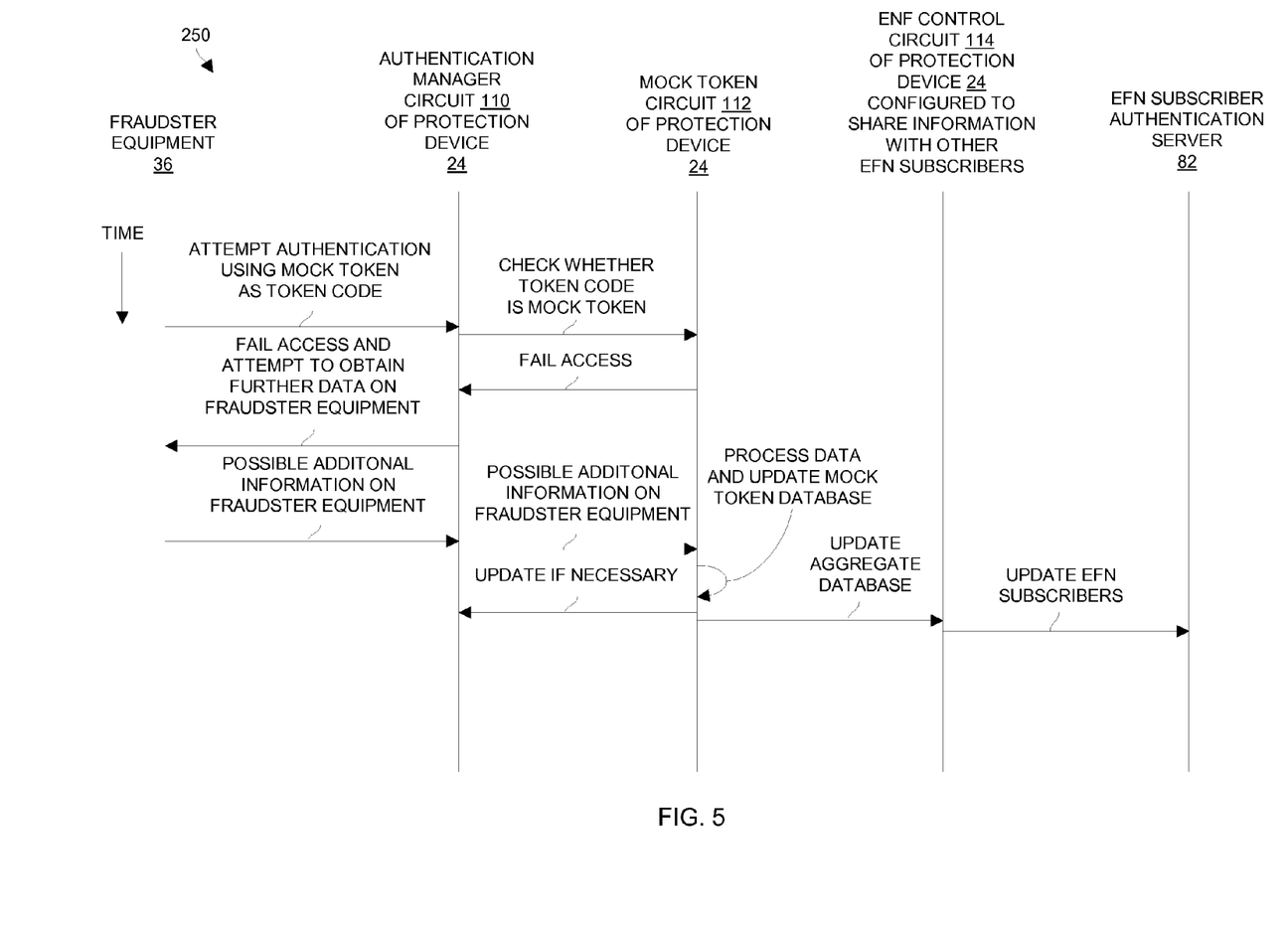
FIG. 5 is a sequence diagram illustrating certain activity within the electronic environment of FIG. 1.

FIG. 5 is a sequence diagram 250 illustrating certain fraud protection activity within the electronic environment 20. As is shown in the sequence diagram 250, once a mock token 34 falls into the hands of a fraudster, the fraudster may try to use the mock token 34 as a token code 54 during an authentication attempt involving the authentication manager circuit 110 of the protection device 24 (also see FIG. 2). Such an authentication attempt may involve a protected resource 26 which is not shown in FIG. 5 for simplicity (also see the login attempt 50 and the protected resource 26 in FIG. 1).

When the authentication manager circuit 110 receives the mock token 34 as the token code 54, the authentication manager circuit 110 checks with the mock token circuit 112 (also see FIG. 2). The mock token circuit 112 determines that the token 54 is a mock token 34, e.g., by checking the mock token database 122 (FIG. 2), by applying an algorithm, by a watermark detection process, etc.

The mock token circuit 112 then fails access by notifying the authentication manager circuit 110 that the token code 54 is a mock token 34 rather than a legitimate token identifying a legitimate user. In turn, the authentication manager circuit 110 updates the local database 120 (FIG. 2) and fails access but tries to obtain further data regarding the fraudster equipment 36. For example, the authentication manager circuit 110 may make different attempts to query the fraudster equipment 36 or nodes along the network path leading to the fraudster equipment 36 to determine further details about the fraudster equipment 36. The authentication manager circuit 110 passes any further discovered details to the mock token circuit 112.

The mock token circuit 112 processes all of the data regarding the fraudster equipment 36 at hand and updates the mock token database 122. For example, when the mock token 34 was provided to a first device (i.e. a suspected phishing website) and received from a second device (i.e., a user device), the mock token circuit 112 updates the mock token database 122 to indicate that both the first and second devices are suspected fraudster devices.

Additionally, the mock token circuit 112 determines whether the mock token 34 was planted within an actual database of sensitive data. If so, the mock token circuit 112 immediately informs the authentication manager 110 that the protected resource 26 has been unknowingly compromised thus enabling the authentication manager circuit 110 to take instant remedial action. For example, the authentication manager circuit 110 may access the local database 120 (FIG. 2) to determine the owner of the protected resource 26 and then immediately notify the owner of the compromise. Furthermore, the mock token circuit 112 provides authentication factor data to the EFN control circuit 114 to update the aggregate database 124. The EFN control circuit 114 then shares the authentication factor data from the aggregate database 124 with EFN subscribers thus improving the authentication abilities of the EFN subscribers.

It should be understood that any further attempts by the fraudster equipment 36 to authenticate with the authentication manager circuit 110 can be denied immediately without further communication with the mock token circuit 112. That is, the authentication manager circuit 110 now has the ability to fail future authentication attempts by the fraudster equipment 36 by directly accessing the local database 120 (FIG. 2).

As described above, improved techniques involve protecting against fraud using mock tokens 34 which appear to be legitimate user tokens that identify legitimate users. Initially, the mock tokens 34 are allowed to fall into the hands of fraudsters. When the fraudsters later attempt to use the mock tokens to access protected resources 26 (e.g., during authentication), such use is easily detectable and access to the protected resources 26 can be denied. Additionally, such use provides an opportunity for security-related equipment to obtain information about the fraudsters such as IP addresses of fraudster equipment, fraudster geographical location information, fraudster browser capabilities, routing information, and so on. This fraudster information can then be used to enhance various forms of security such as adaptive authentication which can perform authentication operations based on a variety of factors including client IP addresses, client geographical locations, client browser capabilities, etc.

While various embodiments of the invention have been particularly shown and described, it will be understood by those skilled in the art that various changes in form and details may be made therein without departing from the spirit and scope of the invention as defined by the appended claims.

For example, the various operating components of the protection device 24 were shown as being co-located in FIGS. 1 and 2 for simplicity. In other arrangements, one or more of these operating components reside in different locations. For example, the authentication manager circuit 110, the mock token circuit 112 and the EFN control circuit 114 can reside in separate devices which are distributed across the electronic environment 20. Moreover, the various operations performed by the mock token circuit 112 (e.g., mock token distribution, mock token detection, mock token tracking, etc.) can be performed by separate electronic devices within the electronic environment 20. Such modifications and enhancements are intended to belong to various embodiments of the invention.

What is claimed is:

1. A method of fraud protection, the method comprising:
providing a first mock token to first suspected fraudster equipment in response to a first phishing attempt, the mock token appearing to be a legitimate user token that identifies a legitimate user, wherein no legitimate token is provided to the first suspected fraudster equipment in response to the first phishing attempt, and storing the first mock token in a first database entry associated with the legitimate user and the first suspected fraudster;
providing a second mock token to a second suspected fraudster equipment in response to a second phishing attempt, the mock token appearing to be a legitimate user token that identifies a legitimate user, wherein no legitimate token is provided to the second suspected fraudster equipment in response to the second phishing attempt, and storing the second mock token in a second database entry associated with the legitimate user and the second suspected fraudster;
subsequent to providing the first and second mock tokens, receiving, from suspected fraudster equipment, an authentication request which includes one of the first and second mock tokens stored in the database, thereby identifying the suspected fraudster equipment as a true fraudster; and
in response to receiving the authentication request which uses the mock token from the true fraudster, performing a set of authentication server operations to protect against future activity by the true fraudster;
wherein each legitimate token is derived from a secret seed uniquely associated with a corresponding legitimate user account;

wherein providing the first mock token to the first suspected fraudster equipment in response to the first phishing attempt includes providing log-in information falsely appearing to allow access to a legitimate user account; and wherein the method further includes performing an authentication operation which detects an attempt to use of one of the first and second mock tokens to prove authorization to access the legitimate user account; and wherein performing the set of authentication server operations further includes performing a remedial operation in response to detected use of the mock token, wherein performing the remedial operation in response to detected use of one of the first and second mock tokens includes: outputting a message to a set of authentication servers, the message identifying the fraudster equipment as a source of malicious activity, wherein the set of authentication servers includes a plurality of authentication servers which each control access to protected resources.

2. A method as in claim 1 wherein a mock token list includes a set of mock token entries corresponding to a set of mock tokens; and wherein performing the authentication operation which detects use of one of the first and second mock tokens includes:
during the authentication operation, matching the mock token to a particular mock token entry of the mock token list.

3. A method as in claim 1 wherein performing the remedial operation in response to detected use of one of the first and second mock tokens includes:
preventing the fraudster equipment from accessing a protected resource.

4. A method as in claim 1 wherein performing the remedial operation in response to detected use of one of the first and second mock tokens includes:
communicating with the fraudster to obtain device-specific information.

5. A method as in claim 1 wherein performing the remedial operation in response to detected use of one of the first and second mock tokens includes:
preventing the fraudster equipment from accessing a protected resource; and
communicating with the fraudster equipment to obtain device-specific information.

6. A method as in claim 1 wherein providing the mock token to the fraudster equipment includes placing the mock token in a database that is accessible by the fraudster equipment in an unauthorized manner prior to receiving an attack.

7. A method as in claim 1 wherein:
providing the first mock token includes generating the first mock token to be fake and detectable, and distributing the first mock token at locations that are susceptible to theft of sensitive data; and
wherein the first mock token provides the fraudster equipment with a code that appears to allow access via a login operation to a protected resource, the code, in actuality, not providing access to the protected resource.

8. A method as in claim 1 wherein providing the first mock token to fraudster equipment includes using the first mock token in a login attempt on the first suspected phishing fraudster equipment prior to receiving an attack.

9. A method as in claim 1 wherein providing the first mock token to suspected fraudster equipment includes attempting to log onto the first suspected fraudster equipment in response to receiving a phishing attempt message including a link to the first suspected fraudster equipment.

10. A method as in claim 1 wherein in response to receiving the authentication request which uses the mock token from the true fraudster, the method further includes performing adaptive risk-based authentication.

11. A method as in claim 1 wherein:
the authentication servers of the set of authentication servers are eFraud network (EFN) subscriber authentication servers, each EFN subscriber authentication server being remote from its respective protected resources; and
outputting the message includes sending the message from an EFN controller over a network connection to the EFN subscriber authentication servers of the set of authentication servers.

12. A computer program product having a non-transitory computer readable medium which stores a set of instructions that, when performed by a computerized device, cause the computerized device to:
provide a first mock token to a first suspected fraudster equipment in response to a first phishing attempt, the first mock token appearing to be a legitimate user token that identifies a legitimate user, wherein no legitimate user token is provided to the first suspected fraudster equipment in response to a first phishing attempt, and storing the first mock token in a first database entry associated with the legitimate user and the first suspected fraudster;
provide a second mock token to a second suspected fraudster equipment in response to a second phishing attempt, the mock token appearing to be a legitimate user token that identifies a legitimate user, wherein no legitimate token is provided to the second suspected fraudster equipment in response to a second phishing attempt, and store the second mock token in a second database entry associated with the legitimate user and the second suspected fraudster;
subsequent to providing the first and second mock tokens, receive, from suspected fraudster equipment, an authentication request which includes the first mock token stored in the database, thereby identifying the suspected fraudster equipment as a true fraudster; and
in response to receiving the authentication request which uses the mock token from the true fraudster, perform a set of authentication server operations to protect against future activity by the true fraudster;
wherein each legitimate token is derived from a secret seed uniquely associated with a corresponding legitimate user account;
wherein the first mock token includes log-in information falsely appearing to provide access to a legitimate user account;
wherein performing the set of authentication server operations includes:
performing an authentication operation which detects an attempt to use of one of the first and second mock tokens to prove authorization to access the legitimate user account; and
performing a remedial operation in response to detected use of the mock token, wherein performing the remedial operation in response to detected use of one of the first and second mock tokens includes outputting a message to a set of authentication servers, the message identifying the fraudster equipment as a source of malicious activity, wherein the set of authentication servers includes a plurality of authentication servers which each control access to protected resources.

13. A computer program product as in claim 12 wherein a mock token list includes a set of mock token entries corresponding to a set of mock tokens; and wherein performing the authentication operation which detects use of one of the first and second mock tokens includes:
   during the authentication operation, matching the mock token to a particular mock token entry of the mock token list.

14. A computer program product as in claim 12 wherein performing the remedial operation in response to detected use of one of the first and second mock tokens includes:
   preventing the fraudster equipment from accessing a protected resource; and
   communicating with the fraudster equipment to obtain device-specific information.

15. A method as in claim 10 wherein performing adaptive risk-based authentication includes utilizing at least one of client IP address, client geographical location, and client browser capability.

\* \* \* \* \*